(12) United States Patent
Xue

(10) Patent No.: US 10,764,074 B2
(45) Date of Patent: Sep. 1, 2020

(54) METHOD, APPARATUS, AND SYSTEM FOR PROVIDING SPECIFIED COMMUNICATIONS SERVICE, AND TERMINAL

(71) Applicant: TENCENT TECHNOLOGY (SHENZHEN) COMPANY LIMITED, Shenzhen (CN)

(72) Inventor: Di Xue, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 216 days.

(21) Appl. No.: 15/698,827

(22) Filed: Sep. 8, 2017

(65) Prior Publication Data
US 2017/0373869 A1 Dec. 28, 2017

Related U.S. Application Data

(63) Continuation of application No. PCT/CN2016/078664, filed on Apr. 7, 2016.

(30) Foreign Application Priority Data

May 20, 2015 (CN) .......................... 2015 1 0258879

(51) Int. Cl.
*G06F 15/16* (2006.01)
*H04L 12/18* (2006.01)
(Continued)

(52) U.S. Cl.
CPC .......... *H04L 12/1818* (2013.01); *H04L 29/06* (2013.01); *H04L 51/10* (2013.01);
(Continued)

(58) Field of Classification Search
CPC ... H04L 12/1818; H04L 67/125; H04L 67/42; H04L 51/10; H04L 65/1069; H04L 67/20;
(Continued)

(56) References Cited

U.S. PATENT DOCUMENTS 8,769,031 B1* 7/2014 Lee .................. G06Q 50/01
709/206
8,887,178 B1* 11/2014 Browne ............... G06F 9/541
719/319
(Continued)

FOREIGN PATENT DOCUMENTS

CN 101141612 A 3/2008
CN 101202760 A 6/2008
(Continued)

OTHER PUBLICATIONS

The World Intellectual Property Organization (WIPO) International Search Report for PCT/CN2016/078664 dated Jun. 28, 2016 pp. 1-5.
(Continued)

*Primary Examiner* — Umar Cheema
*Assistant Examiner* — Anh Nguyen
(74) *Attorney, Agent, or Firm* — Anova Law Group, PLLC

(57) ABSTRACT

The present disclosure discloses a method, an apparatus, and a system for providing a specified communications service, and a terminal, and belongs to the field of network technologies. The method includes: sending a specified communications service request to a signaling access server, the specified communications service request carrying a third-party application identifier and a first user identity of a local end, and the signaling access server being configured to provide a specified communications access service; if verification on the third-party application identifier and the first user identity is successful, establishing a signaling path to the signaling access server, the signaling path being configured to provide a signaling transmission interface to the signaling access server; and performing specified communication based on the signaling path.

19 Claims, 6 Drawing Sheets

(51) Int. Cl.
*H04L 29/06* (2006.01)
*H04L 29/08* (2006.01)
*H04L 12/58* (2006.01)

(52) U.S. Cl.
CPC ........ *H04L 65/1069* (2013.01); *H04L 67/125* (2013.01); *H04L 67/20* (2013.01); *H04L 67/42* (2013.01); *H04L 63/08* (2013.01); *H04L 63/10* (2013.01); *H04L 63/12* (2013.01)

(58) Field of Classification Search
CPC ......... H04L 29/06; H04L 63/10; H04L 63/08; H04L 63/12
USPC .......................................................... 709/204
See application file for complete search history.

(56) References Cited

U.S. PATENT DOCUMENTS

| | | | | |
|---|---|---|---|---|
| 9,042,923 | B1* | 5/2015 | Mirho | H04W 4/14 455/412.1 |
| 9,471,466 | B1* | 10/2016 | Garcia | G06F 11/3664 |
| 2003/0028597 | A1* | 2/2003 | Salmi | G06F 21/6245 709/204 |
| 2007/0150480 | A1* | 6/2007 | Hwang | G06Q 30/00 |
| 2011/0244830 | A1* | 10/2011 | Chesnutt | H04L 51/38 455/411 |
| 2015/0088660 | A1* | 3/2015 | Song | G06F 3/0481 705/14.64 |
| 2015/0180870 | A1* | 6/2015 | Zhang | H04L 63/10 726/4 |

FOREIGN PATENT DOCUMENTS

| | | |
|---|---|---|
| CN | 102904903 A | 1/2013 |
| CN | 103581279 A | 2/2014 |
| CN | 103841008 A | 6/2014 |
| CN | 104052754 A | 9/2014 |
| WO | 2008153307 A2 | 12/2008 |

OTHER PUBLICATIONS

The State Intellectual Property Office of the People's Republic of China (SIPO) Office Action 1 for 201510258879.4 dated Apr. 23, 2019 9 Pages (including translation).

* cited by examiner

METHOD, APPARATUS, AND SYSTEM FOR PROVIDING SPECIFIED COMMUNICATIONS SERVICE, AND TERMINAL

CROSS-REFERENCES TO RELATED APPLICATION

This application is a continuation application of PCT Patent Application No. PCT/CN2016/078664, filed on Apr. 7, 2016, which claims priority to claims priority to Chinese Patent Application No. 201510258879.4, filed with the Chinese Patent Office on May 20, 2015 and entitled "METHOD, APPARATUS, AND SYSTEM FOR PROVIDING SPECIFIED COMMUNICATIONS SERVICE," the entire contents of both of which are incorporated herein by reference.

FIELD OF THE TECHNOLOGY

The present disclosure relates to the field of network technologies, and in particular, to a method, an apparatus, and a system for providing a specified communications service, and a terminal.

BACKGROUND OF THE DISCLOSURE

The development of network technologies brings much convenience to people's life. For example, in communication, an Internet-based audio/video communications method is provided, to implement more convenient and rapid communication.

There are two existing audio/video communications methods: (I) an audio/video function is embedded in some social applications, to provide audio/video communication to users; for example, in an instant messaging application, a user may implement a video call with a friend by tapping a video communications option; and (II) a communications software development kit (SDK) used for implementing audio/video communication is provided; the communications SDK is implanted in an application client, and a corresponding SDK is implanted in a background server of an application; the communications SDK in the application client and the SDK in the background server implement audio/video communication by using a private protocol.

In the implementation process of the present disclosure, the inventor finds that the related technology has at least the following problems: during implementation of the audio/video communication, for method (I), a user can perform audio/video communication only by using a particular application installed on a terminal, and cannot open an audio/video service to a third party; for method (II), after the communications SDK is added to the application client, a developer further needs to implant the corresponding communications SDK on a background server side, that is, to transfer operational and maintenance costs to the application developer, and this has a relatively high requirement on an access capability and a development and operation capability of the application developer.

SUMMARY

To solve the problems in the related technology, embodiments of the present disclosure show a method, an apparatus, and a system for providing a specified communications service, and a terminal. The technical solutions are as follows:

According to one aspect, a method for providing a specified communications service is provided, including: sending a specified communications service request to a signaling access server, the specified communications service request carrying a third-party application identifier and a first user identity of a local end, and the signaling access server being configured to provide a specified communications access service; establishing a signaling path to the signaling access server by using a signaling SDK (Software Development Kit) if verification on the third-party application identifier and the first user identity is successful, the signaling path being configured to provide a signaling transmission interface to the signaling access server, the signaling SDK encapsulating an address of the signaling access server, a communications interface between a specified communications service SDK and a backend, and providing a conversion interface between an external account and an internal account in a communications system; and performing specified communication based on the signaling path.

In a possible implementation manner, the performing specified communication based on the signaling path includes: sending an audio/video room creation request to the signaling access server by using the signaling path, and the signaling access server returns an audio/video data service address allocated by an audio/video platform to the local end of a first user corresponding to the first user identity; and performing audio/video communication with a second user based on the audio/video data service address, where the second user is a user invited by the first user to enter an audio/video room.

In a possible implementation manner, the performing audio/video communication with a second user based on the audio/video data service address includes: after the audio/video room is successfully created, sending a second user identity of the second user and an audio/video room identifier to the signaling access server by using the signaling path, and the signaling access server sends an invitation message to the second user by using a message platform, and the second user enters the audio/video room when accepting the invitation; and sending, by the local end, audio/video data to the audio/video data service address, and the audio/video platform sends the audio/video data to the second user in the audio/video room.

In a possible implementation manner, the performing specified communication based on the signaling path further includes: sending a message interaction request to the signaling access server by using the signaling path, where the message interaction request carries message content and a target user, and the signaling access server sends the message content to the target user by using the message platform.

In a possible implementation manner, the performing specified communication based on the signaling path further includes: sending a rich-media uploading request to the signaling access server by using the signaling path, and the signaling access server returns a rich-media data service address and a rich-media file identifier that are allocated by a rich-media platform to the first user; sending a rich-media file to the rich-media data service address; and sending the rich-media file identifier to a target user, and the target user obtains the rich-media data service address based on the rich-media file identifier and downloads the rich-media file from the rich-media data service address.

According to another aspect, a method for providing a specified communications service is provided, including: receiving a specified communications service request of a third-party application client, the specified communications service request carrying a third-party application identifier and a first user identity; performing verification on the third-party application identifier and the first user identity; establishing a signaling path to the third-party application client if the verification on the third-party application identifier and the first user identity is successful, the signaling path being configured to provide a signaling transmission interface; and providing a specified communications service to the third-party application client based on the signaling path.

In a possible implementation manner, before the receiving a specified communications service request of a third-party application client, the method further includes: performing registration on an application applying for access; and issuing an application identifier and application check data to the application that is successfully registered, where the application identifier is used for uniquely identifying the application, and the application check data is used for checking validity of the application.

In a possible implementation manner, the providing a specified communications service to the third-party application client based on the signaling path includes: receiving an audio/video room creation request by using the signaling path; allocating an audio/video data service address to a first user corresponding to the first user identity when verification on the audio/video room creation request is successful; creating an audio/video room based on the audio/video data service address; and providing an audio/video communications service to the first user based on the audio/video room.

In a possible implementation manner, after the providing an audio/video communications service to the first user based on the audio/video room, the method further includes: destroying the audio/video room if it is detected that all users in the audio/video room have exited the room.

In a possible implementation manner, the providing a specified communications service to the third-party application client based on the signaling path includes: receiving a message sending request of the first user by using the signaling path, where the message sending request carries message content and a target user; and sending the message content to the target user if an online instance of the target user is found; or buffering the message content if an online instance of the target user is not found, and not sending the message content to the target user until the target user registers the online instance.

In a possible implementation manner, the providing a specified communications service to the third-party application client based on the signaling path further includes: receiving a rich-media uploading request by using the signaling path; allocating a rich-media data service address and a rich-media file identifier to the first user when verification on the rich-media uploading request is successful; receiving a rich-media file uploaded by the first user to the rich-media data service address; and sending the rich-media data service address to a second user according to a rich-media file identifier carried in a downloading request when receiving the downloading request sent by the second user, and the second user downloads the rich-media file.

According to another aspect, an apparatus for providing a specified communications service is provided, including: a sending module, configured to send a specified communications service request to a signaling access server, the specified communications service request carrying a third-party application identifier and a first user identity of a local end, and the signaling access server being configured to provide a specified communications access service; a path establishment module, configured to: establish a signaling path to the signaling access server if verification on the third-party application identifier and the first user identity is successful, the signaling path being configured to provide a signaling transmission interface to the signaling access server; and a communications module, configured to perform specified communication based on the signaling path.

In a possible implementation manner, the communications module is configured to: send an audio/video room creation request to the signaling access server by using the signaling path, and the signaling access server returns an audio/video data service address allocated by an audio/video platform to the local end of a first user corresponding to the first user identity; and perform audio/video communication with a second user based on the audio/video data service address, where the second user is a user invited by the first user to enter an audio/video room.

In a possible implementation manner, the communications module is configured to: send a second user identity of the second user and an audio/video room identifier to the signaling access server by using the signaling path after the audio/video room is successfully created, and the signaling access server sends an invitation message to the second user by using a message platform, and the second user enters the audio/video room when accepting the invitation; and send audio/video data to the audio/video data service address, and the audio/video platform sends the audio/video data to the second user in the audio/video room.

In a possible implementation manner, the communications module is further configured to send a message interaction request to the signaling access server by using the signaling path, where the message interaction request carries message content and a target user, and the signaling access server sends the message content to the target user by using the message platform.

In a possible implementation manner, the communications module is further configured to: send a rich-media uploading request to the signaling access server by using the signaling path, and the signaling access server returns a rich-media data service address and a rich-media file identifier that are allocated by a rich-media platform to the first user; send a rich-media file to the rich-media data service address; and send the rich-media file identifier to a target user, and the target user obtains the rich-media data service address based on the rich-media file identifier and downloads the rich-media file from the rich-media data service address.

According to still another aspect, a system for providing a specified communications service is provided, including: a signaling access server, a data relationship link platform, a message platform, an audio/video platform, and a rich-media platform, the signaling access server being configured to receive a specified communications service request of a third-party application client, the specified communications service request carrying a third-party application identifier and a first user identity; the data relationship link platform being configured to perform verification on the third-party application identifier and the first user identity; the signaling access server establishing a signaling path to the third-party application client if the verification performed by the data relationship link platform on the third-party application identifier and the first user identity is successful, the signaling path being configured to provide a signaling transmission interface; and the signaling access server being further configured to provide a specified communications service to the third-party application client based on the signaling path and by using at least one platform of the message platform, the audio/video platform, or the rich-media platform.

In a possible implementation manner, the data relationship link platform is further configured to: perform registration on an application applying for access; and issue an application identifier and application check data to the application that is successfully registered, where the application identifier is used for uniquely identifying the application, and the application check data is used for checking validity of the application.

In a possible implementation manner, the signaling access server is configured to: receive an audio/video room creation request by using the signaling path, and send the audio/video room creation request to the data relationship link platform by using the message platform; and the audio/video platform is configured to: allocate an audio/video data service address to a first user corresponding to the first user identity when verification performed by the data relationship link platform on the audio/video room creation request is successful; create an audio/video room based on the audio/video data service address; and provide an audio/video communications service to the first user based on the audio/video room.

In a possible implementation manner, the signaling access server is configured to receive, by using the signaling path, a message sending request sent by the first user, where the message sending request carries message content and a target user, and the signaling access server is further configured to send the message sending request to the message platform; and the message platform sends the message content to the target user if the message platform finds an online instance of the target user; or the message platform buffers the message content if the message platform does not find an online instance of the target user, and does not send the message content to the target user until the target user registers the online instance.

In a possible implementation manner, the signaling access server is configured to: receive a rich-media uploading request by using the signaling path, and send the rich-media uploading request to the data relationship link platform, and the rich-media platform allocates a rich-media data service address and a rich-media file identifier to the first user when verification performed by the data relationship link platform on the rich-media uploading request is successful; and the rich-media platform is configured to: receive a rich-media file uploaded by the first user to the rich-media data service address; and send the rich-media data service address to a second user according to a rich-media file identifier carried in a downloading request when receiving the downloading request sent by the second user, and the second user downloads the rich-media file.

In a possible implementation manner, the signaling access server is configured to destroy the signaling path if receiving a specified communications service ending request of the first user.

According to yet another aspect, a terminal is provided, including: a receiver, a transmitter, a processor separately connected to the receiver and the transmitter, and a memory connected to the processor, the memory being configured to store an instruction executed by the processor, and the processor being configured to operate the instruction stored in the memory and execute the method for providing a specified communications service according to any one of the foregoing aspects.

By implementing the technical solutions shown in the embodiments of the present disclosure: a signaling path is established, based on a request of a third-party application client, between a third-party application client and a system that can provide a specified communications service, so as to provide, to a third-party application, a basis for accessing the specified communications service, and provide a relatively independent specified communications service to an application that does not have a specified communications capability, thereby improving use flexibility of the application, and reducing operation costs and development costs needed when an application developer specifies a communications service.

BRIEF DESCRIPTION OF THE DRAWINGS

To describe the technical solutions in embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make objectives, technical solutions, and advantages of the present disclosure clearer, the following further describes implementation manners of the present disclosure in detail with reference to the accompanying drawings.

Open Authorization (OAUTH) refers to an Internet Protocol used for authorization, and aims at providing a secure, open, and simple standard to authorization of a user resource. Authorization of the OAUTH does not make a third party touch account information of a user (such as a user name and a password), that is, the third party can apply for authorization of the user resource without using the user name and the password of the user. Therefore, the OAUTH is relatively secure.

A software development kit (SDK) generally refers to a set of development tools used by a software engineer for establishing application software for a specific software package, a specified software framework, a specified hardware platform, a specified operating system, and the like.

Push-to-Talk (PTT) originally refers to a service for rapidly establishing a call in the mobile communications field, that is, a call can be made simply by pressing a key.

However, in the Internet field, the PTT mainly refers to a voice intercom function in an offline manner, for example, voice intercom functions (e.g., walkie-talkie) provided by some instant messaging applications or social applications.

Instant messaging (IM) refers to a message interaction function in a social application. An IM user may send and receive a message, a data file, and the like based on the message interaction function provided by the social application. Certainly, the social application in embodiments of the present disclosure may further have other functions, for example, personal status display and subscription. Details are not described herein.

Figure 1:
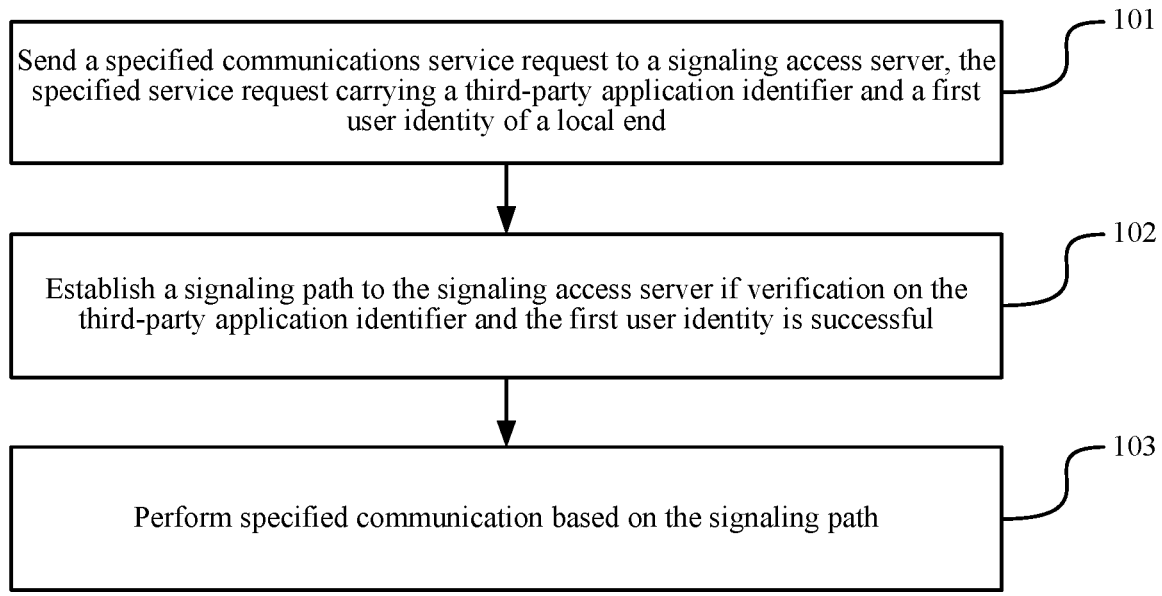
FIG. 1 is a flowchart of a method for providing a specified communications service according to an embodiment of the present disclosure.

FIG. 1 is a flowchart of a method for providing a specified communications service according to an embodiment of the present disclosure. The method for providing a specified communications service shown in this embodiment is executed by a terminal. The terminal may be a mobile phone, a tablet computer, a desktop computer, or the like. Referring to FIG. 1, a procedure of the method includes:

101: Sending a specified communications service request to a signaling access server, the specified communications service request carrying a third-party application identifier and a first user identity of a local end, and the signaling access server being configured to provide a specified communications access service.

102: Establishing a signaling path to the signaling access server if verification on the third-party application identifier and the first user identity is successful, the signaling path being configured to provide a signaling transmission interface to the signaling access server.

103: Performing specified communication based on the signaling path.

Optionally, the performing specified communication based on the signaling path includes: sending an audio/video room creation request to the signaling access server by using the signaling path, and the signaling access server returns an audio/video data service address allocated by an audio/video platform to a first user (e.g., corresponding to the first user identity at the local end); and performing audio/video communication with a second user based on the audio/video data service address, where the second user is a user invited by the first user to enter an audio/video room.

Optionally, the performing audio/video communication with a second user based on the audio/video data service address includes: after the audio/video room is successfully created, sending a second user identity of the second user and an audio/video room identifier to the signaling access server by using the signaling path, and the signaling access server sends an invitation message to the second user by using a message platform, and the second user enters the audio/video room when accepting the invitation; and sending, by the first user (e.g., the local end of the first user), audio/video data to the audio/video data service address, and the audio/video platform sends the audio/video data to the second user in the audio/video room.

Optionally, the performing specified communication based on the signaling path further includes: sending a message interaction request to the signaling access server by using the signaling path, where the message interaction request carries message content and a target user, and the signaling access server sends the message content to the target user by using the message platform.

Optionally, the performing specified communication based on the signaling path further includes: sending a rich-media uploading request to the signaling access server by using the signaling path, and the signaling access server returns a rich-media data service address and a rich-media file identifier that are allocated by a rich-media platform to the first user; sending a rich-media file to the rich-media data service address; and sending the rich-media file identifier to a target user, and the target user obtains the rich-media data service address based on the rich-media file identifier and downloads the rich-media file from the rich-media data service address.

Any combination of all of the foregoing optional technical solutions may form an optional embodiment of the present disclosure, and details are not described one by one herein.

Figure 2:
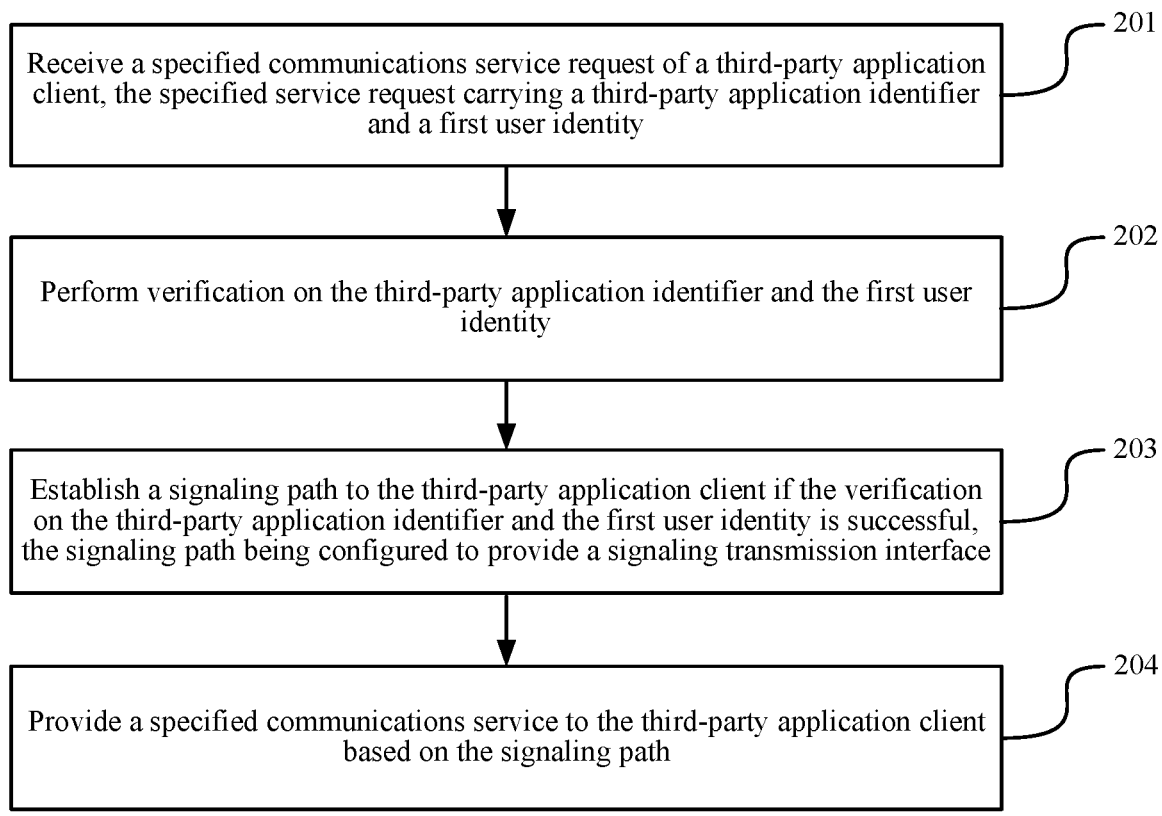
FIG. 2 is a flowchart of a method for providing a specified communications service according to an embodiment of the present disclosure.

FIG. 2 is a flowchart of a method for providing a specified communications service according to an embodiment of the present disclosure. Referring to FIG. 2, a procedure of the method includes:

201: Receiving a specified communications service request of a third-party application client, the specified communications service request carrying a third-party application identifier and a first user identity.

202: Performing verification on the third-party application identifier and the first user identity.

203: Establishing a signaling path to the third-party application client if the verification on the third-party application identifier and the first user identity is successful, the signaling path being configured to provide a signaling transmission interface.

204: Providing a specified communications service to the third-party application client based on the signaling path.

Optionally, before the receiving a specified communications service request of a third-party application client, the method further includes: performing registration on an application applying for access; and issuing an application identifier and application check data to the application that is successfully registered, where the application identifier is used for uniquely identifying the application, and the application check data is used for checking validity of the application (e.g., the third-party application client corresponding to the application, and the application identifier being associated with the third-party application identifier).

Optionally, the providing a specified communications service to the third-party application client based on the signaling path includes: receiving an audio/video room creation request by using the signaling path; allocating an audio/video data service address to a first user corresponding to the first user identity when verification on the audio/video room creation request is successful; creating an audio/video room based on the audio/video data service address; and providing an audio/video communications service to the first user based on the audio/video room.

Optionally, after the providing an audio/video communications service to the first user based on the audio/video room, the method further includes: destroying the audio/video room if it is detected that all users in the audio/video room have exited the room.

Optionally, after the providing an audio/video communications service to the first user based on the audio/video room, the method further includes: destroying the signaling path if receiving a specified communications service ending request of the first user.

Optionally, the providing a specified communications service to the third-party application client based on the signaling path further includes: receiving a message sending request of the first user by using the signaling path, where the message sending request carries message content and a target user; sending the message content to the target user if an online instance of the target user is found; or buffering the message content if an online instance of the target user is not found, and not sending the message content to the target user until the target user registers the online instance.

Optionally, the providing a specified communications service to the third-party application client based on the signaling path further includes: receiving a rich-media uploading request by using the signaling path; allocating a rich-media data service address and a rich-media file identifier to the first user when verification on the rich-media uploading request is successful; receiving a rich-media file uploaded by the first user to the rich-media data service address; and sending the rich-media data service address to a second user according to a rich-media file identifier carried in a downloading request when receiving the downloading request sent by the second user, and the second user downloads the rich-media file.

Any combination of all of the foregoing optional technical solutions may form an optional embodiment of the present disclosure, and details are not described one by one herein.

Figure 3:
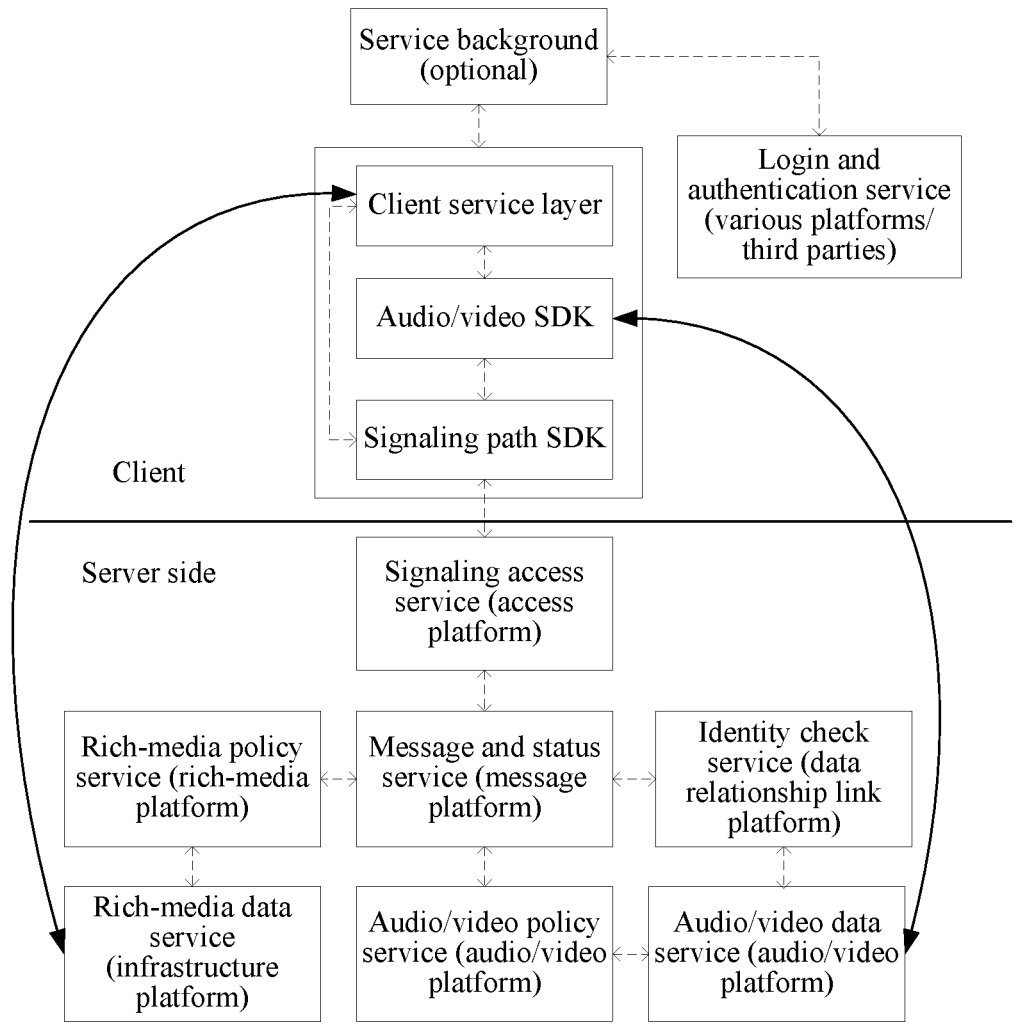
FIG. 3 is a schematic structural diagram of a system for providing a specified communications service according to an embodiment of the present disclosure.

In an actual scenario, a system for providing a specified communications service may refer to a server cluster that includes multiple different function platforms. Referring to FIG. 3, the system for providing a specified communications service may include: an access platform configured to provide a signaling access service, a message platform configured to provide a message and status service, a rich-media platform configured to provide a rich-media policy service, an infrastructure platform configured to provide a rich-media data service, an audio/video platform configured to provide an audio/video policy service and an audio/video data service, a data relationship link platform configured to provide an identity check service, and the like. A client performs data and signaling interaction with various different servers on a server side by using a signaling path.

For ease of understanding, various platforms and interaction between the platforms are introduced below:

(1) The access platform is configured to provide a signaling access service. Specific functions of the access platform include: extranet access scheduling, message/signaling distribution, data encryption, and the like.

(2) The message platform is configured to provide a message and status service. Specific functions of the message platform include: providing user example registration and online state management, message filtering and forwarding, protocol conversion, link encryption, authentication, user identity check and convergence, and the like, which are key services of a basic instant messaging capability.

(3) The rich-media platform is configured to provide a rich-media policy service. Specific functions of the rich-media platform include providing a backend interface related to a rich-media policy, for example, an interface for performing uploading in seconds (e.g., instant uploading) and an interface for obtaining an upload/download address.

(4) The infrastructure platform is configured to provide a rich-media data service. Specific functions of the infrastructure platform include providing data storage capabilities and interfaces for accessing related backend, for example, data upload/download access, storage, and indexing.

(5) The audio/video platform is configured to provide an audio/video policy service and an audio/video data service. Specific functions of the audio/video platform include providing a backend interface related to an audio/video policy, for example, creating a room and querying room information, and further include a backend interface related to audio/video data transition and flow control, and the like.

(6) The data relationship link platform is configured to provide an identity check service. Specific functions of the data relationship link platform include conversion between an external account and an internal account of a communications system, identity check interfaces of various accounts, and the like.

Figure 4:
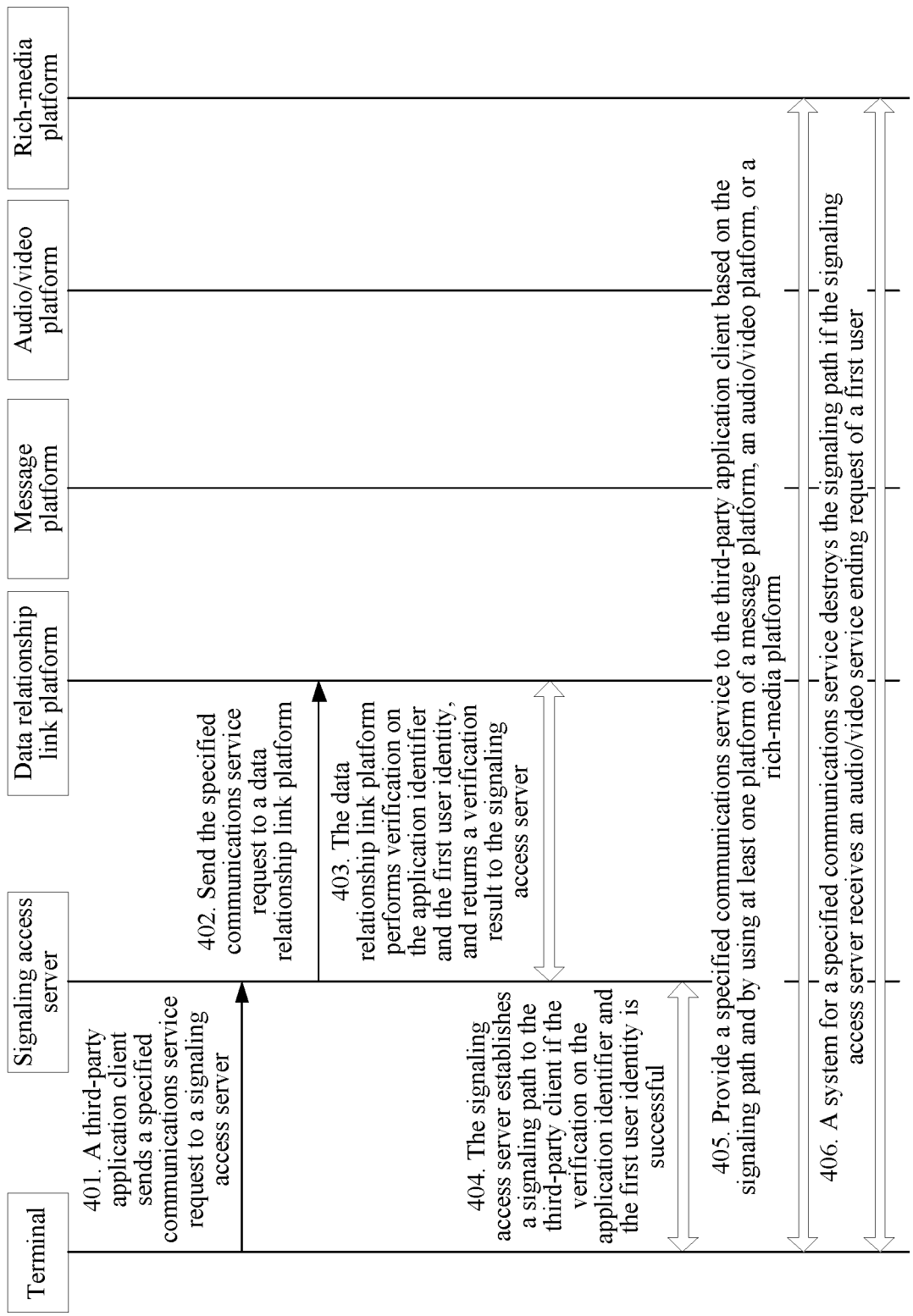
FIG. 4 is a flowchart of a method for providing a specified communications service according to an embodiment of the present disclosure.

Based on the system architecture in FIG. 3, FIG. 4 is a flowchart of a method for providing a specified communications service according to an embodiment of the present disclosure. Referring to FIG. 4, this embodiment specifically includes:

401: A third-party application client sends a specified communications service request to a signaling access server, the specified communications service request carrying a third-party application identifier and a first user identity of a local end, and the signaling access server being configured to provide a specified communications access service.

A first user may be a user of any third-party application client on a terminal. The application registers a specified communications service in advance with a service provider of the signaling access server. Therefore, when the first user needs to use the specified communications service on the third-party application client, the first user may trigger the specified communications service request, and send the specified communications service request to the signaling access server. The specified communications service may be an audio/video service, a message service, a rich-media service, or the like. This is not limited in this embodiment of the present disclosure. When the specified communications service request is sent, the specified communications service request may carry an identifier of the specified communications service. For example, when the specified communications service is an audio/video service, the specified communications service request may carry an identifier of the audio/video service. When the specified communications service request is a rich-media service, the specified communications service request may carry an identifier of the rich-media service.

It should be noted that the developer of the application client may register the client in advance, and the application client can use the specified communications service provided in this embodiment of the present disclosure.

Figure 5:
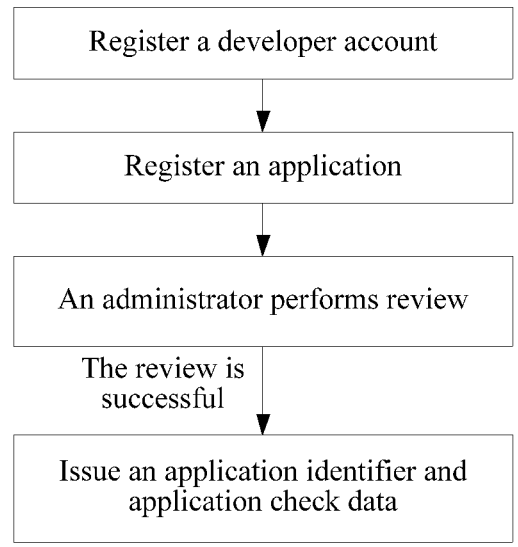
FIG. 5 is a flowchart of a method for providing a specified communications service according to an embodiment of the present disclosure.

Referring to FIG. 5, the registration process may include the following steps:

Step One: Performing Registration on an Application Applying for Access.

An application developer that needs to use the specified communications service may register a developer account to a system for the specified communications service (that is, a service provider). The registration process may be: sending, by the application developer, a registration request to the signaling access server, and the signaling access server reviews the application developer according to information such as an application identifier and a target access service that are carried in the registration request. During implementation, the application developer may perform payment at a stage of requesting registration. After determining that the payment is successful, the service provider performs registration on the application of the application developer. Certainly, the payment process may be performed online or offline. This is not limited in this embodiment of the present disclosure.

It should be noted that in addition to the application identifier and the target access service, the foregoing registration request may further carry other basic information about the application, for example, an application number and information that is needed in application access. These pieces of information may be provided by the application developer at an actual registration stage. This is not limited in this embodiment of the present disclosure.

For an application developer, a developer account may be registered, so that the application developer can input, based on the developer account, information related to the application, so that the application client registered by the application developer uses the specified communications service provided by the system for providing a specified communications service.

Step two: Issuing an application identifier and application check data to the application that is successfully registered, where the application identifier is used for uniquely identifying the application, and the application check data is used for checking validity of the application.

When registration approval of an administrator of the service provider on the application is successful, the application identifier (Appid) used for uniquely identifying the application may be issued to the application that is successfully registered, and the application check data (Appkey) is issued to the application. The application check data may be generated according to basic information about the application. The generation process may be performed by using a preset encryption algorithm. Details are not described herein. A terminal may obtain the application identifier and the application check data when installing the application, so that the terminal may request the system for providing a specified communications service for the specified communications service based on the application identifier and the application check data in a subsequent operation process of the application.

The foregoing registration may be based on the OAUTH Protocol provided in this embodiment, so that when an application user subsequently uses the specified communications service provided by the system for providing a specified communications service, authorization of the OAUTH does not make the signaling access server touch account information of the user (for example, a user name and a password), that is, the system for providing a specified communications service can apply for authorization of the user resource without using the user name and the password of the user. Therefore, privacy is relatively good, and security is relatively high.

402: The signaling access server sends the specified communications service request to a data relationship link platform when receiving the specified communications service request from the terminal of the first user (e.g., the local end that runs the third-party application).

403: The data relationship link platform performs verification on the application identifier and the first user identity, and returns a verification result to the signaling access server.

The verification process may be viewed as a process of initializing a signaling path. In the verification process, the data relationship link platform performs verification according to the application identifier and the first user identity that are carried in the received specified communications service request, and may provide a specified communications service, such as an audio/video service, to the first user when the verification is successful.

404: The signaling access server establishes a signaling path to the third-party application client if the verification on the application identifier and the first user identity is successful, the signaling path being configured to provide a signaling transmission interface.

The third-party application client may provide a specified communications service SDK, for example, an audio/video SDK. An address of the signaling access server and a function interface that is necessary for the specified communications service are encapsulated in the SDK, so as to be used by a client service side. The signaling path may be established by a signaling SDK. The signaling SDK encapsulates the address of the signaling access server and a communications interface between the specified communications service SDK and a backend, and provides a conversion interface between an external account and an internal account in a communications system. The establishment of the signaling path may include multiple times of data interaction between the specified communications service SDK and the signaling SDK, and the signaling access server. Details are not described in this embodiment of the present disclosure.

405: The signaling access server is further configured to provide a specified communications service to the third-party application client based on the signaling path and by using at least one platform of a message platform, an audio/video platform, or a rich-media platform.

The signaling access server may provide the specified communications service to the third-party application client based on the signaling path and multiple specified communications platforms. The specified communications service includes a message service, an audio/video service, a rich-media service, and the like.

406: A system for providing a specified communications service destroys the signaling path if the signaling access server receives an audio/video service ending request of a first user.

When a session ends, the signaling access server destroys the signaling path, that is, destroys a backend online instance created for providing the specified communications service.

When the signaling access server establishes the signaling path to a terminal, an online instance is created for the first user on the specified communications service side. The specified communications service is provided to the first user based on the online instance. Different specified communications service procedures such as the audio/video service, the message service, and the rich-media service are used as examples, to describe each procedure in detail.

For the audio/video service, in a process of providing the audio/video communications service, interaction between the terminal and the system for providing a specified communications service may include the following steps A1 to A4:

A1: A terminal sends an audio/video room creation request to the signaling access server by using the signaling path.

When the first user wants to perform audio/video communication, the first user may perform an operation on the terminal, to trigger the audio/video room creation request.

A2: The signaling access server sends the audio/video room creation request to the audio/video platform when receiving the audio/video room creation request, so that the audio/video platform allocates an audio/video data service address to the first user.

A3: The audio/video platform creates an audio/video room based on the audio/video data service address.

It should be noted that the audio/video platform may create the audio/video room based on an audio/video policy service. For example, different rooms may be created for different users according to different user attributes such as user levels, different quantities of people that can be accommodated in rooms, and different types of sharable data in rooms. A quantity of people that can be accommodated in a room created by a user with a high user level may be greater than a quantity of people that can be accommodated in a room created by a user with a low user level. Certainly, whether to make a distinction specifically according to the user attributes or how to make a distinction may be determined according to negotiation between the application and the system for providing a specified communications service in a registration process. Details are not described in this embodiment of the present disclosure.

A4: The audio/video platform provides an audio/video communications service to the first user based on the audio/video room.

Specifically, after the audio/video room is successfully created, the first user may send a second user identity and an audio/video room identifier to the signaling access server by using the signaling path, so that the signaling access server sends an invitation message to a second user by using a message platform, and the second user enters the audio/video room when accepting the invitation. The first user sends audio/video data to the audio/video data service address, so that the audio/video platform sends the audio/video data to the second user in the audio/video room.

When successfully creating the audio/video room, the audio/video platform may send the audio/video room identifier to the first user, so that the first user invites the second user to enter the audio/video room by using a service backend or the message platform. The first user and the second user that is invited by the first user may have a subsequent audio/video call by using the audio/video data service address. The audio/video platform forwards inter-user call data in real time.

After receiving the invitation message from the initiator, the second user sends a request to the audio/video platform to enter the audio/video room (that is, to participate in a current audio/video session). After successfully entering the audio/video room, the second user obtains the audio/video data service address from the audio/video policy service provided by the audio/video platform. Then, the second user may enter the audio/video room and perform real-time audio/video communication with another user in the room.

The invited second user may be a user on a user relationship link of the first user, or may be a user that does not have any relationship with the first user. The invitation may be performed by entering a user identity, a user name, or a user group identifier, or even by entering a phone number. That is, when obtaining the second user, a terminal may obtain the user identity, the user name, the user group identifier, or the like entered by the first user on the terminal. For different types of clients, when the second user is obtained, there may be different obtained objects. For example, for a client of an instant messaging type, the obtained object may be a user identity or the like. For a client of an information sharing platform type, the obtained object may be a user group identifier or the like.

Further, the first user may perform processing such as dissolution on the created audio/video room. A user may exit or enter the audio/video room again according to a user's need. When detecting that all users in the current audio/video room have exited the room, the audio/video platform destroys the audio/video room. Optionally, in the foregoing case, the audio/video platform may send, by using a signaling access platform, a room dissolution notification to the first user and the second user that once entered the audio/video room, and perform destruction processing on the audio/video room after sending the notification, so as to avoid excessive occupation of space of the audio/video data service in the audio/video platform.

Certainly, after the audio/video room is destroyed, the online instance that is created earlier may also be destroyed. The destruction of the online instance may be performed after the audio/video room is destroyed and when no other request of the first user is received within preset duration. The preset duration may be appointed between a registered application and the system for providing a specified communications service. This is not limited in this embodiment of the present disclosure.

For transceiving of a message, in a process of providing the audio/video communications service, interaction between the terminal and the system for providing a specified communications service may include the following steps B1 to B5:

B1: The first user sends a message sending request to the signaling access server, where the message sending request carries message content and a target user.

The first user may send a message to another user. Certainly, an object to which the message is sent by the first user may also be any user selected by the first user, and the user may be a user under a same account mechanism as the first user, or may be a user to which the system for providing a specified communications service provides a service.

B2: The signaling access server sends the message sending request to the message platform.

B3: The message platform searches for an online instance of the target user according to the target user carried in the message sending request of the first user.

B4: The message platform sends the message content to the target user if the online instance of the target user is found.

B5: The message platform buffers the message content if the online instance of the target user is not found, and does not send the message content to the target user until the target user registers the online instance.

In the foregoing steps B2 to B5, for the message platform, if a service is provided also by the system for providing a specified communications service to the target user, and an online instance is registered on the message platform, the message content may be forwarded to the target user in real time. If the target user does not currently use a service provided by the system for providing a specified communications service, for example, in offline state, the message content may be buffered, and then the message is subsequently forwarded after the target user performs registration. The process may also be performed based on contact information used when the target user performs registration on the message platform. For example, the target user sets an offline message notification or a forwarding mechanism; or the message platform may give a notification according to the specific mechanism that is set by the message platform and in a contact manner that corresponds to the contact information. For example, if the target user sets an email notification, the message content or prompt information used for prompting the message content may be sent to an email box set by the target user.

For the rich-media service, in a process of providing a rich-media service, interaction between the terminal and the system for providing a specified communications service may include the following steps C1 to C5:

C1: A terminal sends a rich-media uploading request to the signaling access server by using the signaling path.

C2: The signaling access server sends the rich-media uploading request to the data relationship link platform, so that the data relationship link platform performs verification on the data transmission request.

The rich-media uploading request may carry an application identifier and a first user identity, so that the data relationship link platform performs verification on the rich-media uploading request, and provides the rich-media service to the first user when the verification is successful.

C3: The rich-media platform allocates a rich-media data service address and a rich-media file identifier to the first user when the verification performed by the data relationship link platform on the rich-media uploading request is successful.

The rich-media data service address refers to an address of storage space for storing rich-media data. The data transmission request may further carry related information such as a data amount, so that the rich-media platform allocates corresponding storage space to the data. To facilitate operations such as query on the stored data, the rich-media platform further allocates a file identifier to the rich-media data.

C4: The rich-media platform receives a rich-media file uploaded by the first user to the rich-media data service address.

C5: The rich-media platform sends the rich-media data service address to a second user according to a rich-media file identifier carried in a downloading request when receiving the downloading request sent by the second user, so that the second user downloads the rich-media file.

The first user may send the rich-media file identifier to the second user, so that the second user downloads the rich-media file from the rich-media platform based on the rich-media file identifier. A specific download process may be that the second user sends the downloading request carrying the rich-media file identifier to the rich-media platform, and the rich-media platform may send the corresponding rich-media data service address to the second user according to the rich-media file identifier, so that the second user downloads the rich-media file from the rich-media data service address.

It should be noted that the message service, the audio/video service, and the multimedia data service that are described above may coexist in a service process. For example, when the system for providing a specified communications service provides the audio/video service to the first user, the system for providing a specified communications service may provide at least one of the message service or the multimedia data service to the first user, so as to provide at least two specified communications services to the third-party application client by using multiple platforms in the entire system for providing a specified communications service, so that when using the audio/video service or the multimedia data service, a user of a client may still perform message interaction by using a message service such as a text, thereby improving flexibility of the specified communications service.

A solution of an open audio/video instant messaging system is provided to resolve problems that currently, a research and development requirement on the audio/video instant messaging field is relatively high, operation maintenance costs are relatively high, and small or medium application developers cannot independently provide services due to a limited research and development capability and a limited operation capability in spite of strong needs. This solution has the following advantages: high quality, low costs, flexible access, convenient use, and a wide product coverage range. By means of the technical solution provided in the present disclosure, the application developers may not need be concerned about operation deployment of a backend service, and only needs to focus on fields at which the application developers are good at. The application developers may enjoy a high-quality real-time audio/video instant messaging communications service at extremely low development costs and low operation costs, so as to produce competitive applications of their own more easily and occupy the market rapidly.

According to the method shown in this embodiment of the present disclosure, a signaling path is established, based on a request of a third-party application client, between the third-party application client and a system that can provide a specified communications service, so as to provide, to a third-party application, a basis for accessing the specified communications service, and provide a relatively independent specified communications service to an application that does not have a specified communications capability, thereby improving use flexibility of the application, and reducing operation costs and development costs needed when an application developer specifies a communications service.

Figure 6:
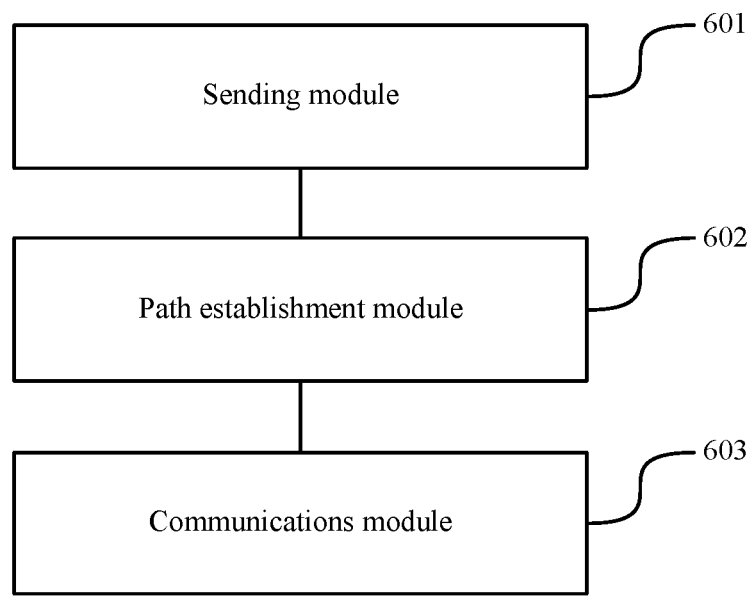
FIG. 6 is a schematic structural diagram of an apparatus for providing a specified communications service according to an embodiment of the present disclosure.

FIG. 6 is a schematic structural diagram of an apparatus for providing a specified communications service according to an embodiment of the present disclosure. The apparatus is configured to execute the methods that are used for providing a specified communications service and that are shown in the embodiments shown in FIG. 1 and FIG. 4. Referring to FIG. 6, the apparatus includes: a sending module 601, configured to send a specified communications service request to a signaling access server, the specified communications service request carrying a third-party application identifier and a first user identity of a local end, and the signaling access server being configured to provide a specified communications access service; a path establishment module 602, configured to: establish a signaling path to the signaling access server if verification on the third-party application identifier and the first user identity is successful, the signaling path being configured to provide a signaling transmission interface to the signaling access server; and a communications module 603, configured to perform specified communication based on the signaling path.

Optionally, the communications module 603 is configured to: send an audio/video room creation request to the signaling access server by using the signaling path, so that the signaling access server returns an audio/video data service address allocated by an audio/video platform to a first user; and perform audio/video communication with a second user based on the audio/video data service address, where the second user is a user invited by the first user to enter an audio/video room.

The communications module 603 is configured to: send a second user identity and an audio/video room identifier to the signaling access server by using the signaling path after the audio/video room is successfully created, so that the signaling access server sends an invitation message to the second user by using a message platform, and the second user enters the audio/video room when accepting the invitation; and send audio/video data to the audio/video data service address, so that the audio/video platform sends the audio/video data to the second user in the audio/video room.

Optionally, the communications module 603 is further configured to send a message interaction request to the signaling access server by using the signaling path, where the message interaction request carries message content and a target user, so that the signaling access server sends the message content to the target user by using the message platform.

Optionally, the communications module 603 is further configured to: send a rich-media uploading request to the signaling access server by using the signaling path, so that the signaling access server returns a rich-media data service address and a rich-media file identifier that are allocated by a rich-media platform to the first user; send a rich-media file to the rich-media data service address; and send the rich-media file identifier to a target user, so that the target user obtains the rich-media data service address based on the rich-media file identifier and downloads the rich-media file from the rich-media data service address.

Any combination of all of the foregoing optional technical solutions may form an optional embodiment of the present disclosure, and details are not described one by one herein.

According to the apparatus shown in this embodiment of the present disclosure, a signaling path is established, based on a request of a third-party application client, between the third-party application client and a system that can provide a specified communications service, so as to provide, to a third-party application, a basis for accessing the specified communications service, and provide a relatively independent specified communications service to an application that does not have a specified communications capability, thereby improving use flexibility of the application, and reducing operation costs and development costs needed when an application developer specifies a communications service.

It should be noted that when the apparatus for providing a specified communications service in the foregoing embodiment provides a specified communications service, an example of division of the foregoing functional modules is given for description. In actual application, the foregoing functions may be allocated to and completed by different functional modules according to needs, that is, an inner structure of a device is divided into different functional modules, to complete all or some of the functions described above. In addition, embodiments of the apparatus for providing a specified communications service and the method for providing a specified communications service belong to one concept. For a specific implementation process, refer to the method embodiment, and details are not described herein again.

Figure 7:
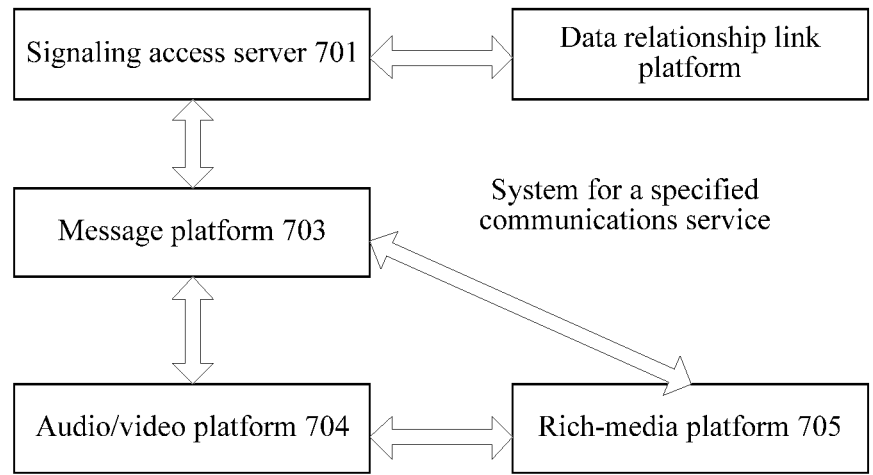
FIG. 7 is a schematic structural diagram of a system for providing a specified communications service according to an embodiment of the present disclosure.

FIG. 7 is a schematic structural diagram of a system for providing a specified communications service according to an embodiment of the present disclosure. Servers or platforms in the system may be configured to execute the methods that are used for providing a specified communications service and that are shown in the embodiments shown in FIG. 2 and FIG. 3. Referring to FIG. 7, the system includes: a signaling access server 701, a data relationship link platform 702, a message platform 703, an audio/video platform 704, and a rich-media platform 705.

The signaling access server is configured to receive a specified communications service request of a third-party application client, and the specified communications service request carries a third-party application identifier and a first user identity.

The data relationship link platform is configured to perform verification on the third-party application identifier and the first user identity.

The signaling access server establishes a signaling path to the third-party application client if the verification performed by the data relationship link platform on the third-party application identifier and the first user identity is successful, where the signaling path is configured to provide a signaling transmission interface.

The signaling access server is further configured to provide a specified communications service to the third-party application client based on the signaling path and by using at least one platform of the message platform, the audio/video platform, or the rich-media platform.

Optionally, the data relationship link platform is further configured to: perform registration for an application applying for access; and issue an application identifier and application check data to the application that is successfully registered, where the application identifier is used for uniquely identifying the application, and the application check data is used for checking validity of the application.

Optionally, the signaling access server is configured to: receive an audio/video room creation request by using the signaling path, and send the audio/video room creation request to the data relationship link platform by using the message platform.

The audio/video platform is configured to: allocate an audio/video data service address to a first user when verification performed by the data relationship link platform on the audio/video room creation request is successful; create an audio/video room based on the audio/video data service address; and provide an audio/video communications service to the first user and a second user based on the audio/video room, where the second user is a user invited by the first user to enter an audio/video room.

Optionally, the audio/video platform is configured to destroy the audio/video room if it is detected that all users in the audio/video room have exited the room.

Optionally, the signaling access server is configured to destroy the signaling path if receiving a specified communications service ending request of the first user.

Optionally, the signaling access server is configured to receive, by using the signaling path, a message sending request sent by the first user, where the message sending request carries message content and a target user, and the signaling access server is further configured to send the message sending request to the message platform; and the message platform sends the message content to the target user if the message platform finds an online instance of the target user; or the message platform buffers the message content if the message platform does not find an online instance of the target user, and does not send the message content to the target user until the target user registers the online instance.

Optionally, the signaling access server is configured to: receive a rich-media uploading request by using the signaling path, and send the rich-media uploading request to the data relationship link platform; and when verification performed by the data relationship link platform on the rich-media uploading request is successful, the rich-media platform allocates a rich-media data service address and a rich-media file identifier to the first user; and the rich-media platform is configured to: receive a rich-media file uploaded by the first user to the rich-media data service address; and send the rich-media data service address to a second user according to a rich-media file identifier carried in a downloading request when receiving the downloading request sent by the second user, so that the second user downloads the rich-media file.

Any combination of all of the foregoing optional technical solutions may form an optional embodiment of the present disclosure, and details are not described one by one herein.

Figure 8:
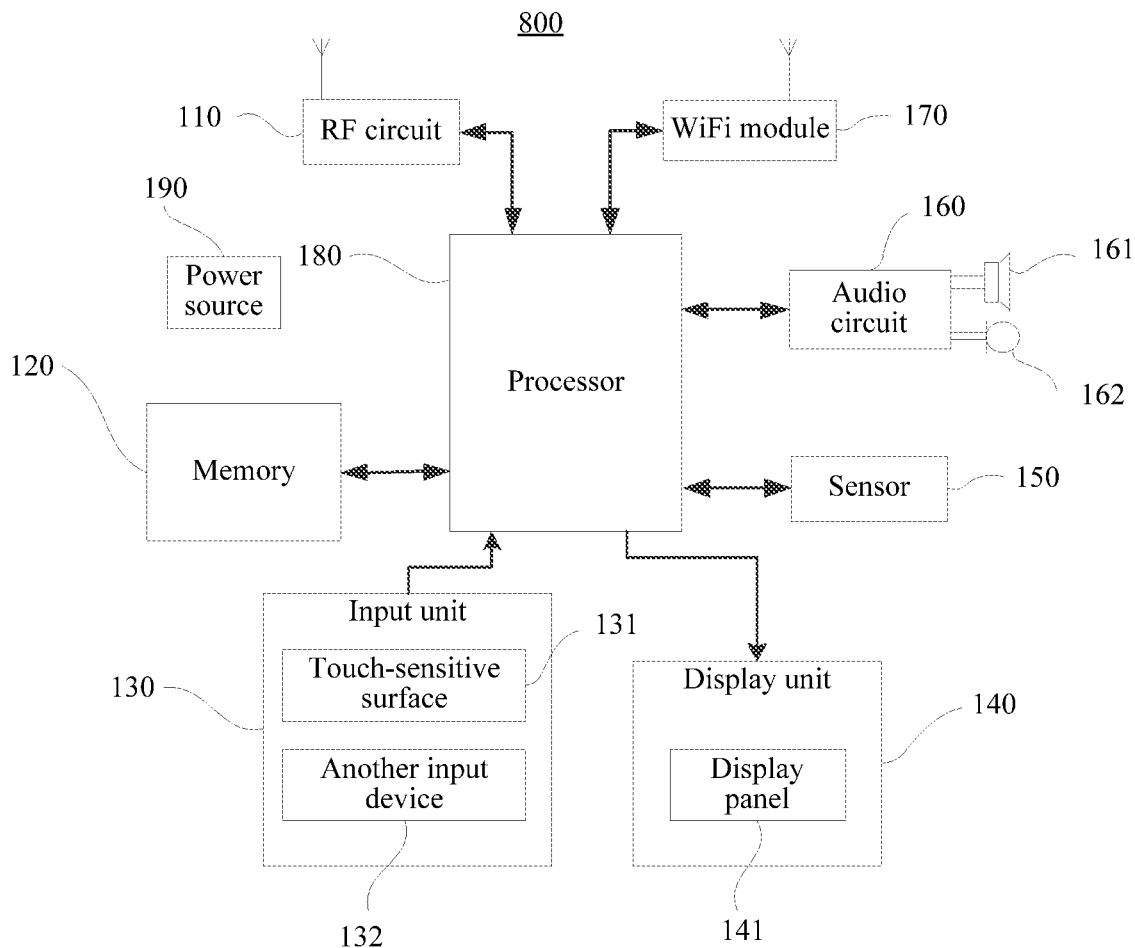
FIG. 8 is a schematic structural diagram of a terminal according to an embodiment of the present disclosure.

Referring to FIG. 8, FIG. 8 is a schematic structural diagram of a terminal involved in an embodiment of the present disclosure. The terminal may be configured to implement the method for providing a specified communications service in the foregoing embodiment.

Specifically, the terminal 800 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power source 190. A person skilled in the art may understand that a terminal structure shown in FIG. 8 constitutes no limitation to the terminal, and the terminal may include more or fewer components than those shown in the figure, or some components may be combined, or a different component deployment may be used.

The RF circuit 110 may be configured to: receive and send signals during an information receiving and sending process or a call process, particularly, after receiving downlink information of a base station, deliver the downlink information of the base station to one or more processors 180 for processing, and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may communicate with a network and another device by means of wireless communication. The wireless communication may use any communications standard or protocol, including but not limited to: Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and a module. The processor 180 runs the software program and module stored in the memory 120, to implement various functional applications and data processing. The memory 120 may mainly include a program storage area and a data storage area, where the program storage area may store an operating system, an application required by at least one function (such as a sound play function and an image display function), and the like; and the program storage area may store data (such as audio frequency data and an address book) created according to the use of the terminal 800, and the like. In addition, the memory 120 may include a high-speed random access memory, and may also include a non-volatile memory such as at least one disk storage device, a flash memory device, or another volatile solid-state storage device. Correspondingly, the memory 120 may further include a memory controller, to provide access of the processor 180 and the input unit 130 to the memory 120.

The input unit 130 may be configured to: receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which is also referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, or a joystick.

The display unit 140 may be configured to display information entered by the user or information provided to the user, and various graphical user interfaces of the terminal 800. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although in FIG. 8, the touch-sensitive surface 131 and the display panel 141 are used as two separate parts to implement input and output functions, in some embodiments, the touch-sensitive surface 131 and the display panel 141 may be integrated to implement the input and output functions.

The terminal 800 may further include at least one sensor 150, for example, an optical sensor, a motion sensor, and other sensors. Specifically, the optical sensor may include an ambient light sensor and a proximity sensor, where the ambient light sensor may adjust brightness of the display panel 141 according to luminance of the ambient light. The proximity sensor may switch off the display panel 141 and/or backlight when the terminal 800 is moved to the ear. As one type of motion sensors, a gravity acceleration sensor may detect magnitude of accelerations in various directions (generally on three axes), may detect magnitude and a direction of the gravity in static state, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 800 are not further described herein.

The audio circuit 160, a speaker 161, and a microphone 162 may provide an audio interface between the user and the terminal 800. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 800.

WiFi is a short distance wireless transmission technology. The terminal 800 may help, by using the WiFi module 170, the user to receive and send emails, browse a webpage, access streaming media, and so on. The WiFi module provides wireless broadband Internet access for the user. Although FIG. 8 shows the WiFi module 170, it may be understood that the WiFi module 170 is not a necessary component of the terminal 800. When required, the WiFi module may be omitted as long as the essence of the present disclosure is not changed.

The processor 180 is a control center of the terminal 800, and is connected to various parts of the entire mobile phone by using various interfaces and lines. By running or executing the software program and/or module stored in the memory 120, and invoking data stored in the memory 120, the processor 180 executes various functions of the terminal 800 and processes data, thereby performing overall monitoring on the mobile phone. Optionally, the processor 180 may include one or more processing cores. Preferably, the processor 180 may integrate an application processor and a modem processor. The application processor mainly processes an operating system, a user interface, an application, and the like. The modem processor mainly processes wireless communication. It may be understood that the foregoing modem processor may not be integrated into the processor 180.

The terminal 800 further includes the power source 190 (for example, a battery) that supplies power to various components. Preferably, the power source may be logically connected to the processor 180 by using a power management system, so as to implement functions such as charging, discharging, and power consumption management by using the power management system. The power source 190 may further include one or more of a direct current or alternate current power source, a re-charging system, a power source fault detection circuit, a power source converter or an inverter, a power source state indicator, or any other components.

Although not shown in the figure, the terminal 800 may further include a camera, a Bluetooth module, and the like, and details are not described herein. Specifically, in this embodiment, the display unit of the terminal is a touchscreen display, and the terminal further includes a memory and one or more programs. The one or more programs are stored in the memory and configured to be executed by one or more processors. The one or more programs include an instruction used for performing the operations performed by the client in FIG. 1 or FIG. 4.

Figure 9:
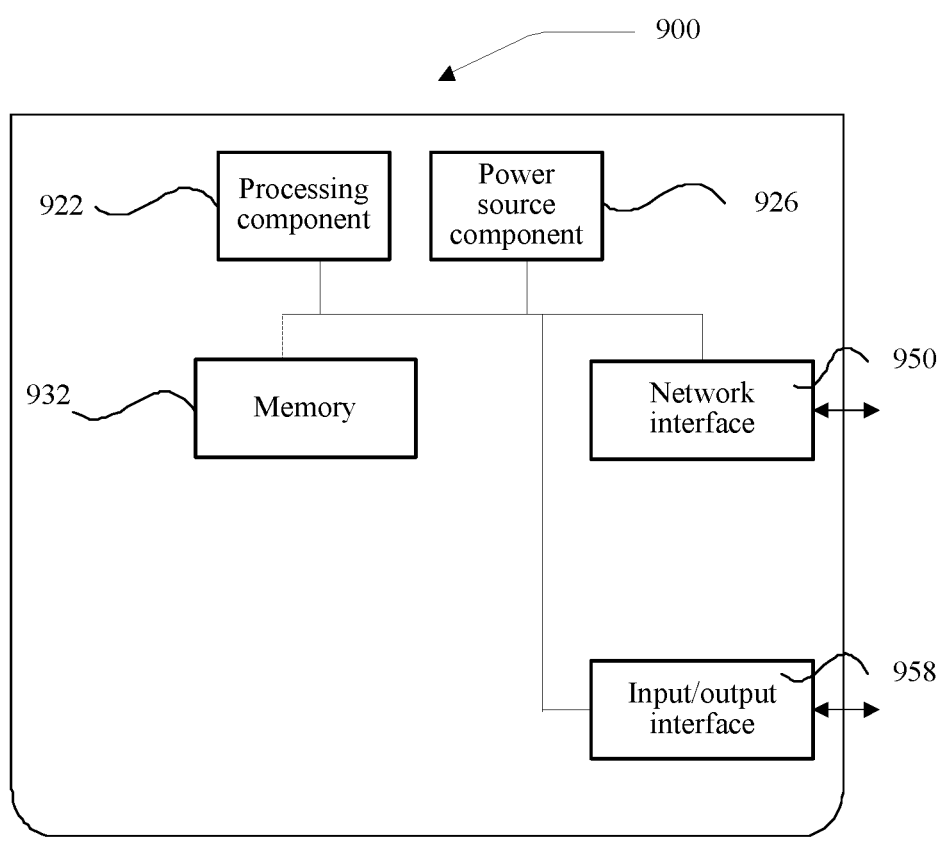
FIG. 9 is a schematic structural diagram of a server according to an embodiment of the present disclosure.

FIG. 9 shows a server according to an example of an embodiment. Referring to FIG. 9, the server 900 includes a processing component 922, which further includes one or more processors and a memory resource represented by a memory 932, which is configured to store an instruction that can be executed by the processing component 922, for example, an application. The application stored in the memory 932 may include one or more modules, where each module corresponds to a group of instructions. In addition, the processing component 922 is configured to execute an instruction, so as to execute steps executed by the server in any one of the foregoing embodiments shown in FIG. 2 and FIG. 3.

The server 900 may further include: a power source component 926, which is configured to execute power management of the server 900, a wired or wireless network interface 950, which is configured to connect the server 900 to a network, and an input/output (I/O) interface 958. The server 900 may operate an operating system stored in the memory 932, for example, Windows Server™, Mac OS X™, Unix™, Linux™, or FreeBSD™.

One or more programs are stored in the memory, and are configured to be executed by one or more processors. The one or more programs include instructions used for performing the operations performed by the server in any one of the foregoing embodiments shown in FIG. 2 to FIG. 4.

In some existing technologies, audio/video functionalities are embedded in a closed system (such as SMA apps, or video call apps). Such functions are not open to third-party applications. In some existing technologies, audio/video client/server SDK providers require to implant client SDK into user's app and implement Server SDK to backend server. While SDK providers are relieved from operating burden, this approach actually passes operation and maintenance costs on to the application developers, so the final audio and video call service quality depends largely on the application developers own access coverage and development of operational capacity. These are precisely lacked for most small and medium-sized application developers, which makes such approach difficult to implement. In addition, the simple audio and video SDK approach cannot meet the needs of application developers for the basic instant messaging capabilities, even if the SDK allows users to fill the form of plug-in instant messaging capabilities, but small and medium developers do not have enough development and operation capacity to implement the plug-in. Further, considering the profit model, Client/Server SDK providers generally charges a costly fee by the number of servers, passing the operating pressure to the access side, so that the access side (especially small and medium-sized application developers) bears double weight of capital and operation, making the access costs very high.

By implementing the disclosed method and system, application developers do not need to worry about operational deployment of the back-end service, and can just focus on specific target areas, and enjoy high quality real-time audio and video instant messaging services with the low development cost and the low operating cost, which is easier to quickly create their own boutique applications, and facilitates rapid occupation of the market.

A person of ordinary skill in the art may understand that all or some of the steps of the embodiments may be implemented by using hardware, or may be implemented by using a program to instruct related hardware. The program may be stored in a computer readable storage medium. The storage medium mentioned above may be a read-only memory, a magnetic disk, or an optical disc.

The foregoing descriptions are merely examples of the embodiments of the present invention, but are not intended to limit the present disclosure. Any modification, equivalent replacement, and improvement made without departing from the spirit and principle of the present disclosure shall fall within the protection scope of the present disclosure.

What is claimed is:

1. A method for providing a specified communications service, the method comprising:
   sending a specified communications service request to a signaling access server, the specified communications service request including an audio/video room creation request, a third-party application identifier and a first user identity of a user terminal, and the signaling access server being in communication with at least one specified communications service platform server, the at least one specified service platform server including an audio/video service platform server and a message service platform server;

establishing a signaling path to the signaling access server via a signaling SDK (Software Development Kit) and based on a successful verification on the third-party application identifier and the first user identity, the signaling path being configured to provide a signaling transmission interface to the signaling access server and the user terminal;

determining that the signaling access server has forwarded the specified communications service request to the at least one specified communications service platform server, the at least one specified communications service platform server allocating a specified communications service address to the user terminal, the specified communications service address including an audio/video data service address allocated by the audio/video service platform server to the user terminal of a first user corresponding to the first user identity;

performing specified communication service based on the signaling path, in collaboration with the signaling access server and the at least one specified communications service platform server; and determining that the signaling access service has sent an invitation message to a second user via the message service platform server, the invitation message including the specified communications service address.

2. The method according to claim 1, further comprising:
after an audio/video room is successfully created, sending a second user identity of the second user and an audio/video room identifier to the signaling access server via the signaling path, wherein the second user enters the audio/video room after responding to the invitation message; and
sending, by the user terminal, audio/video data to the audio/video data service address, wherein the audio/video service platform server sends the audio/video data to the second user in the audio/video room.

3. The method according to claim 1, wherein performing specified communication service based on the signaling path further comprises:
sending a rich-media uploading request to the signaling access server via the signaling path, wherein the signaling access server returns a rich-media data service address and a rich-media file identifier that are allocated by a rich-media platform server to the first user;
sending a rich-media file to the rich-media data service address; and
sending the rich-media file identifier to a target user, wherein the target user obtains the rich-media data service address based on the rich-media file identifier and downloads the rich-media file from the rich-media data service address.

4. A method for providing a specified communications service by a signaling access server, the method comprising:
establishing communication with at least one specified communications service platform server, the at least one specified service platform server including an audio/video service platform server and a message service platform server;
receiving a specified communications service request, the specified communications service request including an audio/video room creation request, a third-party application identifier and a first user identity of a user terminal;
performing verification on the third-party application identifier and the first user identity;
establishing a signaling path to the third-party application client via a signaling SDK (Software Development Kit) and based on a successful verification on the third-party application identifier and the first user identity, the signaling path being configured to provide a signaling transmission interface to the signaling access server and the user terminal;

after forwarding the specified communications service request to the at least one specified communications service platform server, causing the at least one specified communications service platform server to allocate a specified communications service address to the user terminal, the specified communications service address including an audio/video data service address allocated by the audio/video service platform server to the user terminal of a first user corresponding to the first user identity;

providing a specified communications service to the third-party application client based on the signaling path and in collaboration with the at least one specified communications service platform server; and sending an invitation message to a second user via the message service platform server, the invitation message including the specified communications service address.

5. The method according to claim 4, prior to receiving the specified communications service request, the method further comprising:
performing registration on an application applying for access; and
issuing an application identifier and application check data to the application that is successfully registered, wherein the application identifier is used for identifying the application, and the application check data is used for checking validity of the application, the application identifier being associated with the third-party application identifier.

6. The method according to claim 4, wherein providing the specified communications service to the third-party application client based on the signaling path comprises:
creating an audio/video room based on the audio/video data service address; and
providing an audio/video communications service to the first user and the second user based on the audio/video room.

7. The method according to claim 4, wherein providing the specified communications service to the third-party application client based on the signaling path further comprises:
receiving a rich-media uploading request via the signaling path;
allocating a rich-media data service address and a rich-media file identifier to a first user corresponding to the first user identity based on a successful verification on the rich-media uploading request;
receiving a rich-media file uploaded by the first user to the rich-media data service address; and
sending the rich-media data service address to a second user for the second user to download the rich-media file.

8. An apparatus for providing a specified communications service, the apparatus comprising a memory and a processor coupled to the memory, the processor being configured to:
send a specified communications service request to a signaling access server, the specified communications service request including an audio/video room creation request, a third-party application identifier and a first user identity of a user terminal, and the signaling access server being in communication with at least one specified communication service platform sever, the at least one specified service platform server including an audio/video platform server and a message service platform server;

establish a signaling path to the signaling access server via a signaling SDK (Software Development Kit) and based on a successful verification on the third-party application identifier and the first user identity, the signaling path being configured to provide a signaling transmission interface to the signaling access server and the user terminal;

determine that the signaling access server has forwarded the specified communications service request via the signaling path to the at least one specified communications service platform server, wherein the specified communications service platform allocates a specified communications service address to the user terminal, the specified communications service address including an audio/video data service address allocated by the audio/video service platform server to the user terminal of a first user corresponding to the first user identity;

perform specified communication in collaboration with the signaling path and the at least one specified communications service platform; and determine that the signaling access service has sent an invitation message to a second user via the message service platform server, the invitation message including the specified communications service address.

9. The apparatus according to claim 8, wherein the processor is further configured to:

perform audio/video communication with the second user based on the audio/video data service address.

10. The apparatus according to claim 9, wherein the at least one specified communications service platform server includes a message service platform server, and the processor is further configured to:

send a second user identity of the second user and an audio/video room identifier to the signaling access server via the signaling path after the audio/video room is successfully created, wherein the signaling access server sends the invitation message to the second user via the message service platform server, and the second user enters the audio/video room after responding to the invitation message; and send audio/video data to the audio/video data service address, wherein the audio/video service platform server sends the audio/video data to the second user in the audio/video room.

11. The apparatus according to claim 8, wherein the at least one specified communications service platform server includes a rich-media service platform server and the processor is further configured to:

send a rich-media uploading request to the signaling access server via the signaling path, wherein the signaling access server returns a rich-media data service address and a rich-media file identifier that are allocated by the rich-media service platform server to the first user;

send a rich-media file to the rich-media data service address; and send the rich-media file identifier to a target user, wherein the target user obtains the rich-media data service address based on the rich-media file identifier and downloads the rich-media file from the rich-media data service address.

12. A system for providing a specified communications service, the system comprising: a signaling access server in communication with an identity service platform server, a message service platform server, an audio/video service platform server, and a rich-media service platform server, wherein the signaling access server includes a first memory and a first processor coupled to the first memory, the first processor being configured to:

receive a specified communications service request of a third-party application client, the specified communications service request including an audio/video room creation request, a third-party application identifier and a first user identity;

establish a signaling path to the third-party application client via a signaling SDK (Software Development Kit) and based on a successful verification performed by the data relationship link platform on the third-party application identifier and the first user identity, the signaling path being configured to provide a signaling transmission interface between the signaling access server and a user terminal associated with the first user identity;

after forwarding the specified communications service request to the audio/video service platform server, causing the audio/video service platform server to allocate a specified communications address to the user terminal, the specified communications service address including an audio/video data service address allocated by the audio/video service platform server to the user terminal of a first user corresponding to the first user identity;

provide a specified communications service to the third-party application client based on the signaling path and via at least one of the message platform server, the audio/video service platform server, or the rich-media platform server; and send an invitation message to a second user via the message service platform server, the invitation message including the specified communications service address;

and wherein the identity service platform server includes a second memory and a second processor coupled to the second memory, the second processor being configured to:

perform verification on the third-party application identifier and the first user identity.

13. The system according to claim 12, wherein the second processor of the identity service platform server is further configured to:

perform registration on an application applying for access; and issue an application identifier and application check data to the application that is successfully registered, wherein the application identifier is used for identifying the application, and the application check data is used for checking validity of the application, the application identifier being associated with the third-party application identifier.

14. The system according to claim 12, wherein the first processor of the signaling access server is further configured to:

send the audio/video room creation request to the identity service platform server via the message service platform server;

and wherein the audio/video service platform server includes a third memory and a third processor coupled to the third memory, the third processor is configured to:

allocate the audio/video data service address to a first user corresponding to the first user identity based on a successful verification performed by the identity service platform server on the audio/video room creation request;

create an audio/video room based on the audio/video data service address; and provide an audio/video communications service to the first user and the second user based on the audio/video room.

15. The system according to claim 12, wherein the first processor of the signaling access server is further configured to:

receive, via the signaling path, a message sending request sent by the first user, wherein the message sending request includes message content and information on a target user;

send the message sending request to the message service platform server; and in collaboration with the message service platform server, sends the message content to the target user.

16. The system according to claim 12, wherein the first processor of the signaling access server is further configured to:

receive a rich-media uploading request via the signaling path;

send the rich-media uploading request to the identity service platform server; and in collaboration with the rich-media service platform sever, allocates a rich-media data service address and a rich-media file identifier to the first user based on a successful verification performed by the data relationship link platform on the rich-media uploading request; and wherein the rich-media service platform server includes a third memory and a third processor coupled to the third memory, the third processor is configured to:

receive a rich-media file uploaded by the first user to the rich-media data service address; and send the rich-media data service address to a second user for the second user to download the rich-media file.

17. The system according to claim 12, wherein the first processor of the signaling access server is further configured to:

destroy the signaling path upon receipt of a specified communications service ending request of the first user.

18. The method according to claim 1, wherein the at least one specified communications service platform server includes at least one of a rich-media service platform server, a message service platform server, an identity service platform server, and an audio/video service platform server.

19. The method according to claim 1, further comprising:

determining that the first user and the second user have both disconnected from the at least one specified communications service platform server; and sending, by the at least one specified communications service platform server, a dissolution notification to the first user and the second user.

* * * * *